FIG. 15 SEQUENCE PROGRAM

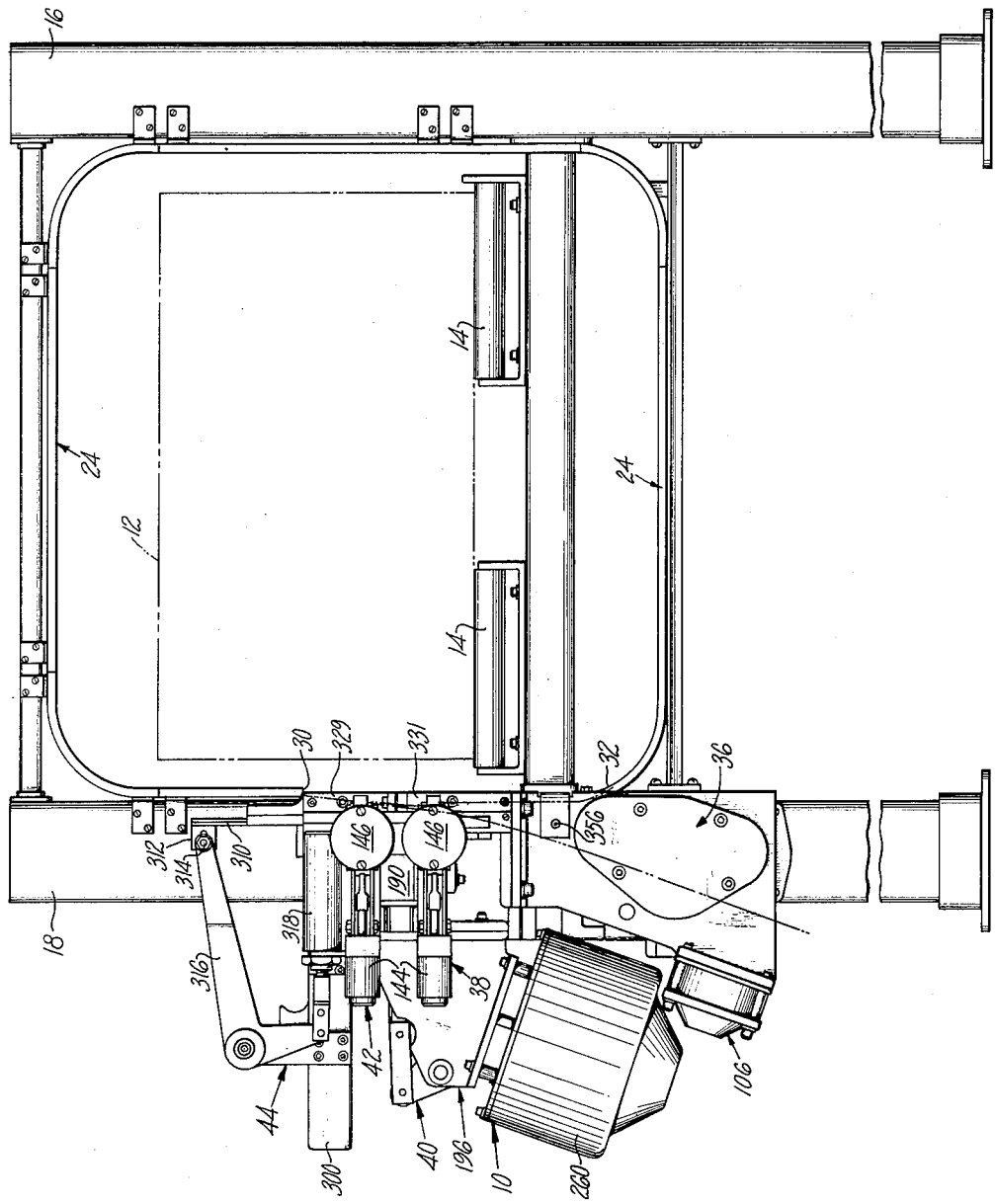

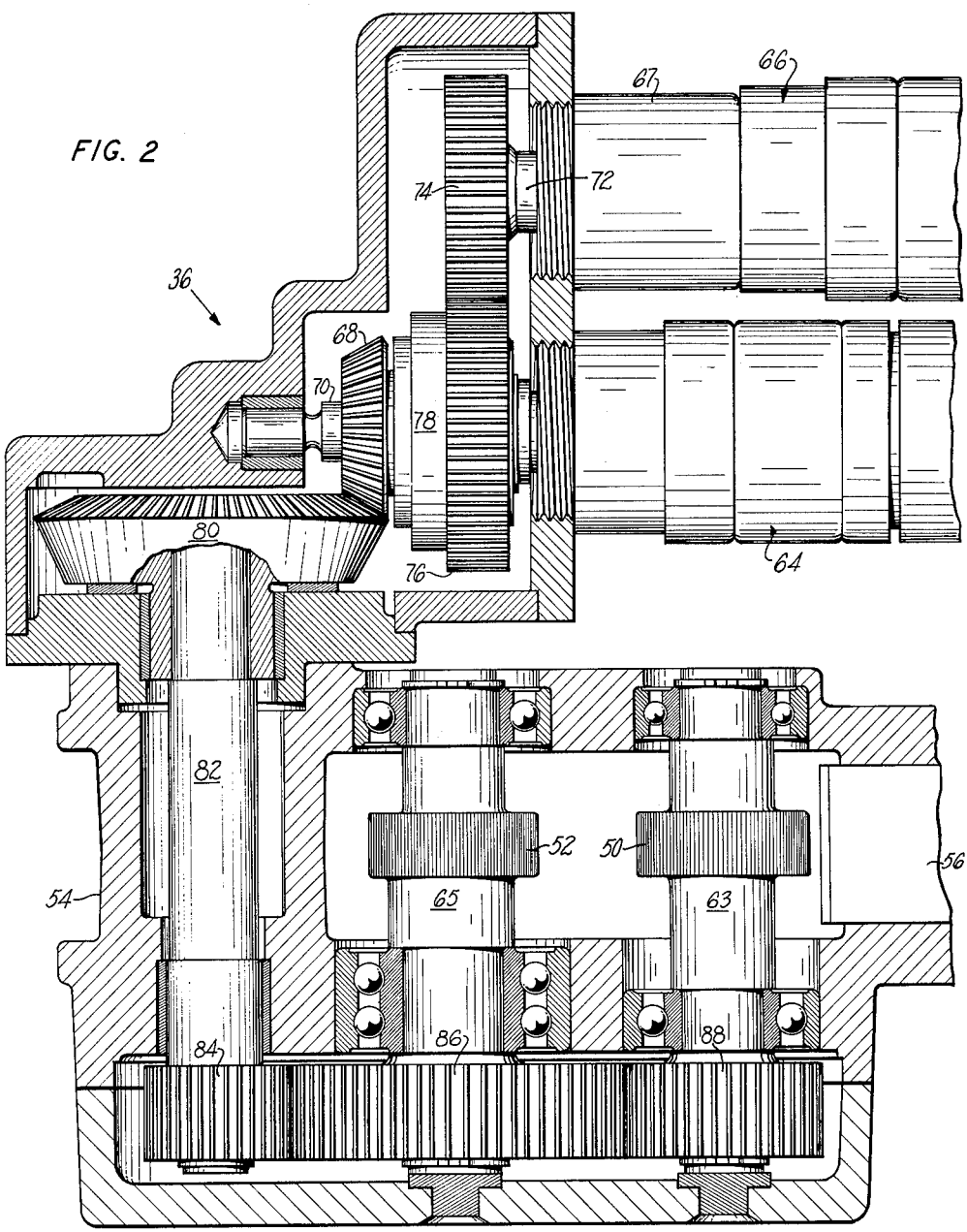

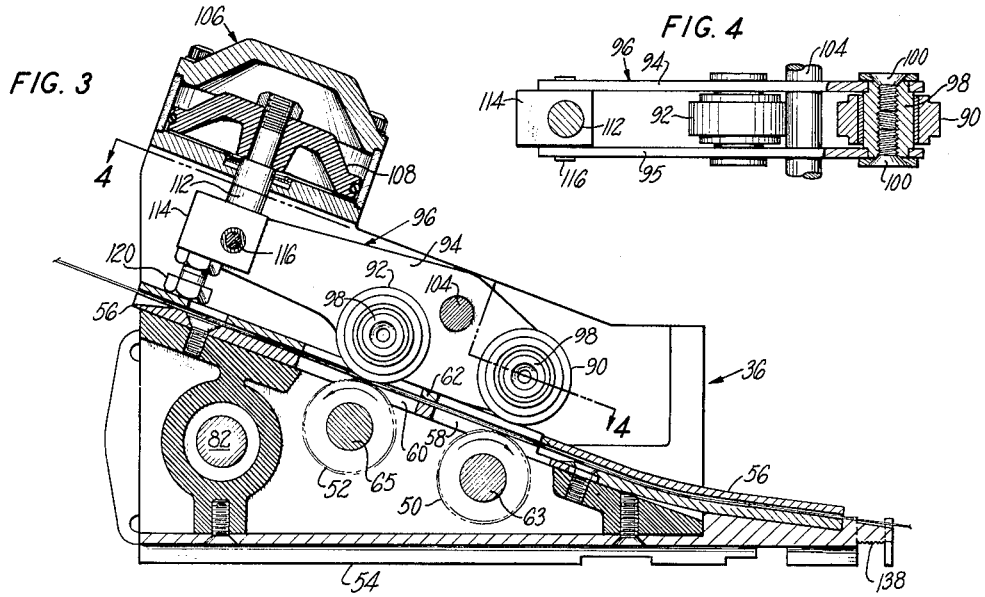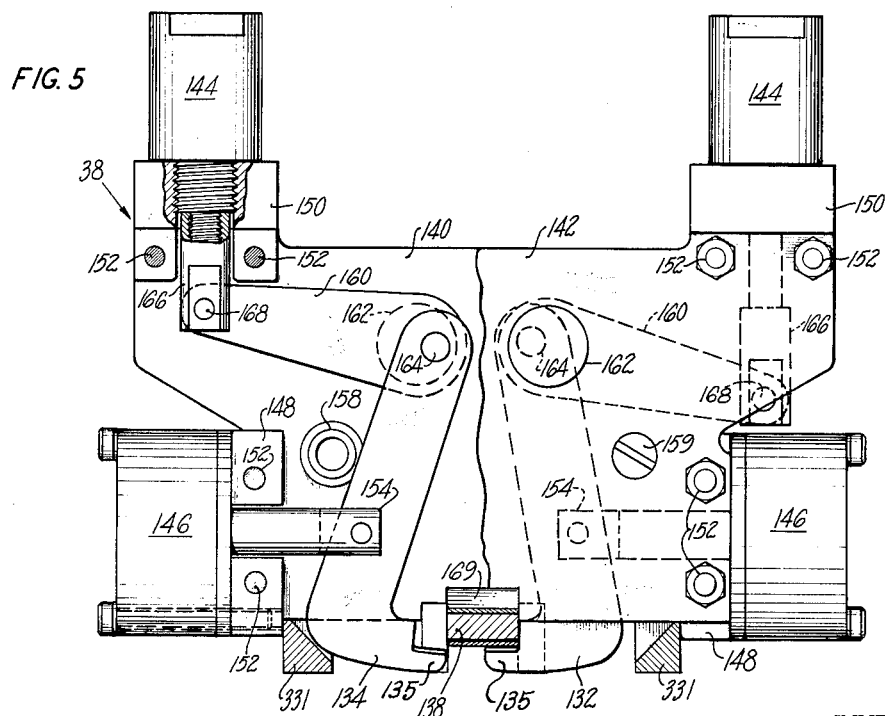

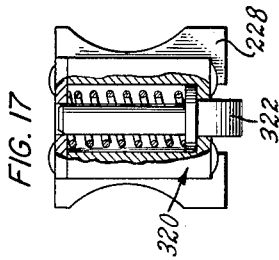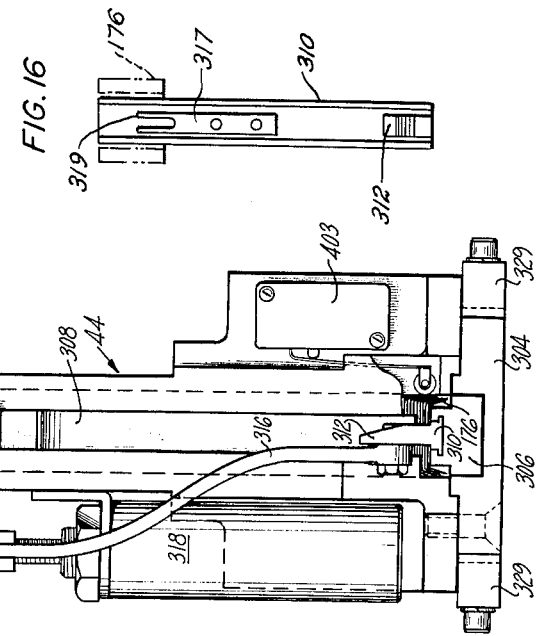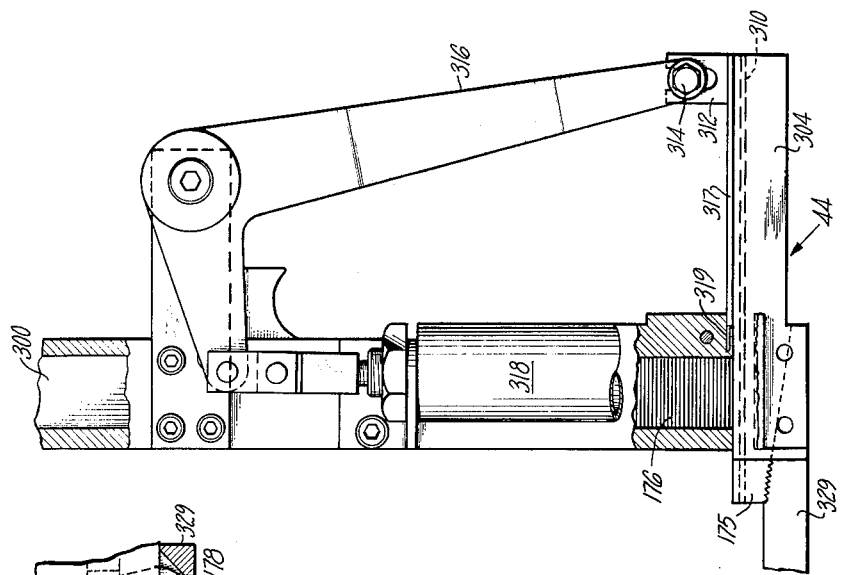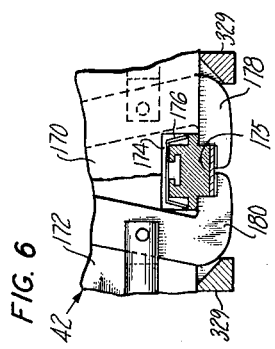

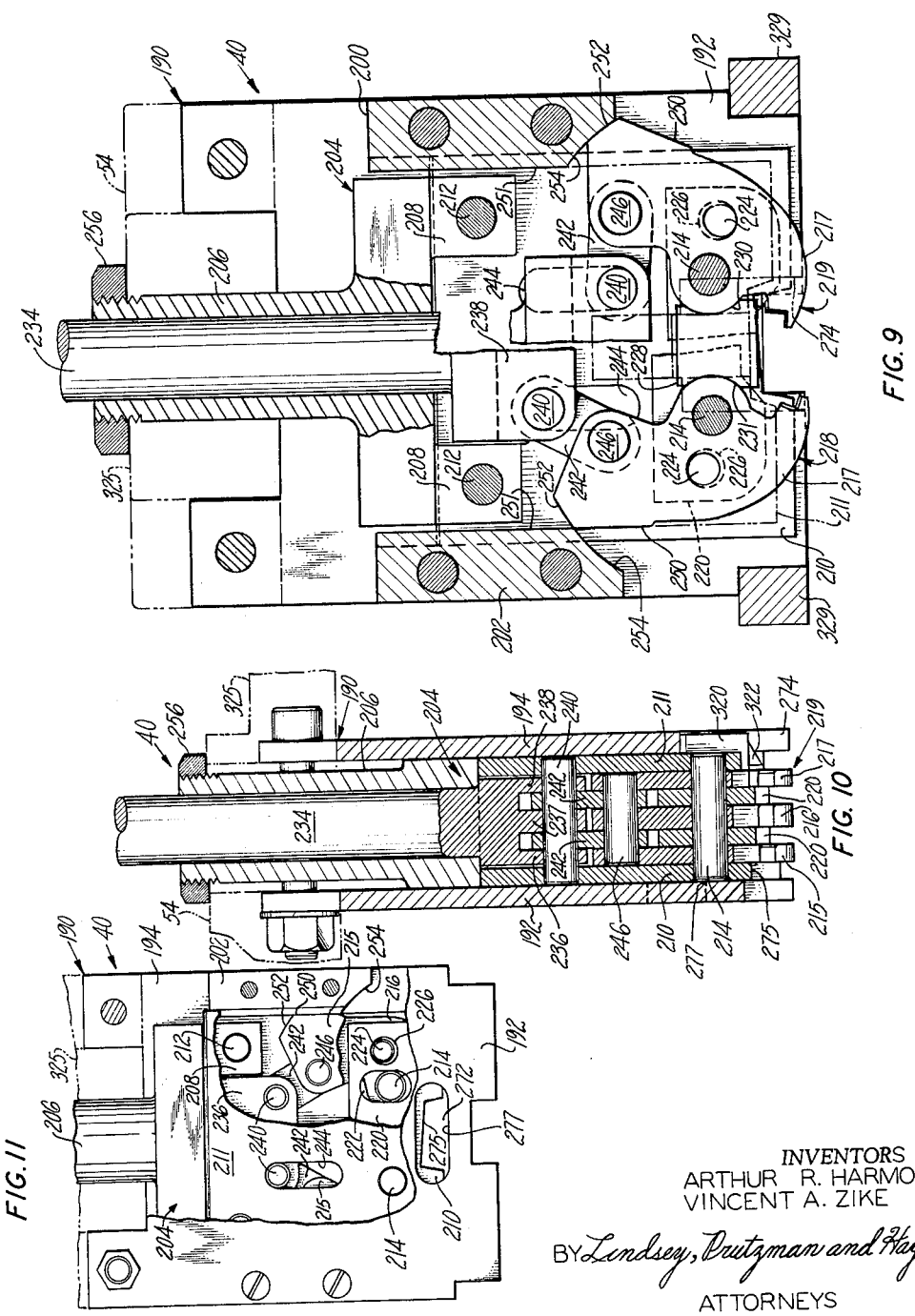

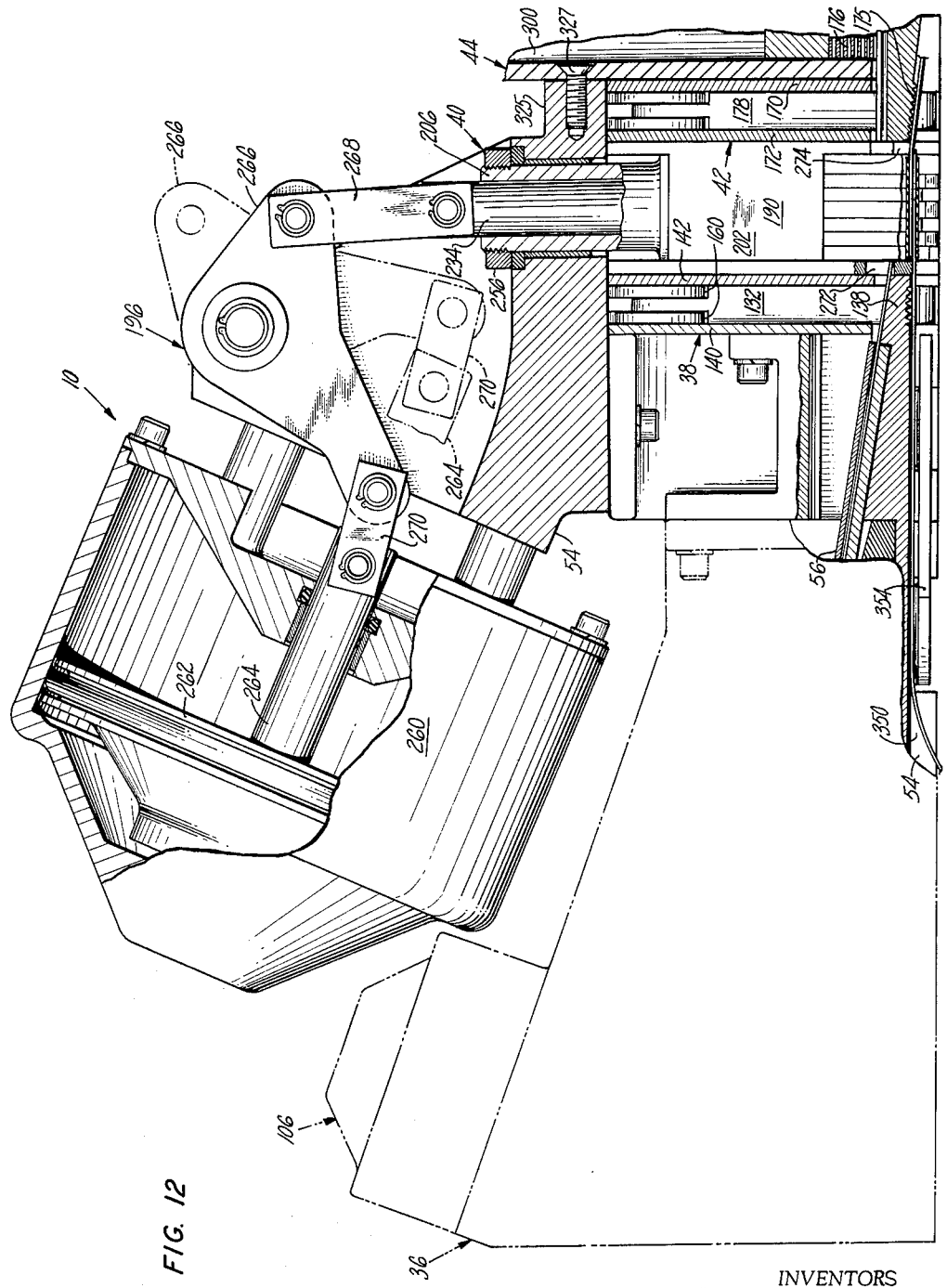

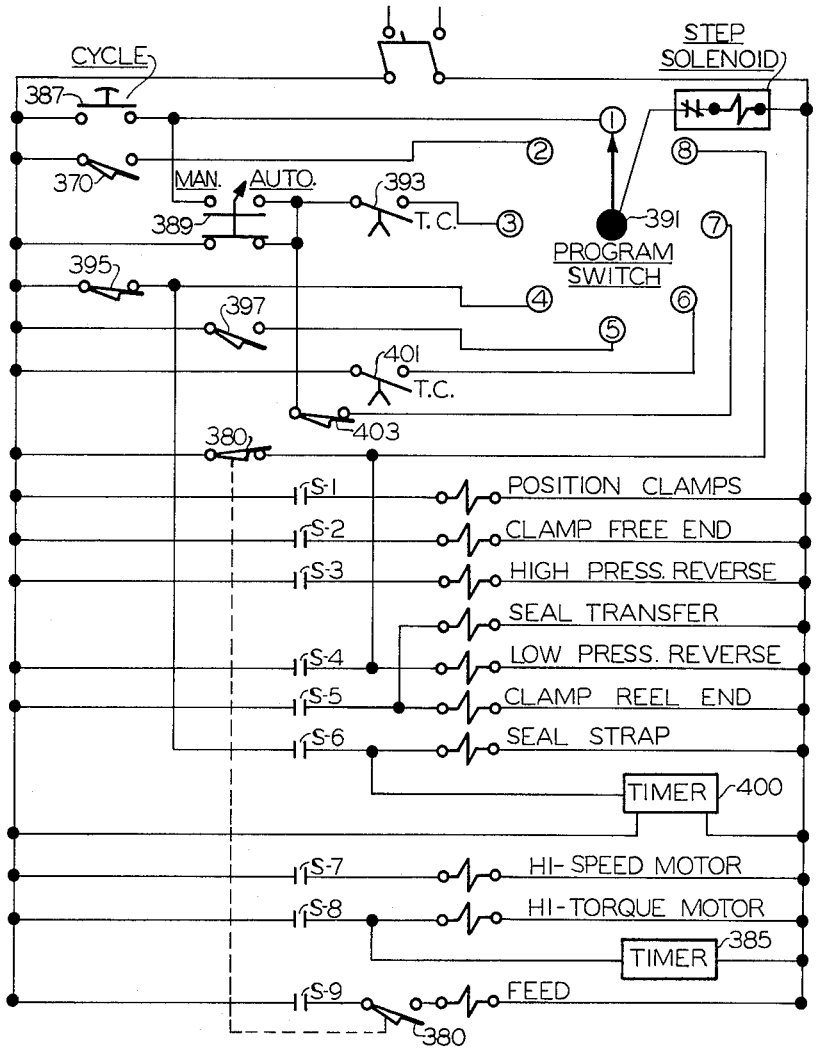

| | SWITCH POSITION | | | | | | | | MACHINE FUNCTION |
|---|---|---|---|---|---|---|---|---|---|
| | 1 | 2 | 3 | 4 | 5 | 6 | 7 | 8 | |
| S-1 | ● | ● | ● | ● | ● | | | ● | POSITION CLAMPS |
| S-2 | ● | ● | ● | ● | ● | | | | CLAMP FREE END |
| S-3 | | | ● | ● | ● | | | | HIGH PRESS. REVERSE |
| S-4 | ● | ● | ● | ● | ● | | | | LOW PRESS. REVERSE |
| S-5 | | | | | ● | ● | | | CLAMP REEL END & TRANSFR SEAL |
| S-6 | | | | | | ● | | | SEAL STRAP |
| S-7 | | ● | ● | ● | | | | ● | HI-SPEED MOTOR |
| S-8 | | | ● | ● | | | | | HI-TORQUE MOTOR |
| S-9 | | | | | | | | ● | FEED |

CONTACTS (● INDICATES CLOSED CONTACTS)

INVENTORS
ARTHUR R. HARMON
VINCENT A. ZIKE
BY Lindsey, Brutzman and Hayes
ATTORNEYS United States Patent Office 3,232,217
Patented Feb. 1, 1966

3,232,217
STRAPPING MACHINE
Arthur R. Harmon, Port Republic, N.J., and Vincent A. Zike, Plainville, Conn., assignors to The Stanley Works, New Britain, Conn., a corporation of Connecticut
Filed May 4, 1964, Ser. No. 364,694
19 Claims. (Cl. 100—30)

The present invention relates to strapping machines of the type conventionally used to apply a metal band or strap to a box, carton, bale or the like as for packaging.

It is an object of the present invention to provide a new and improved strapping machine of the type described which is adapted in sequence to feed a free end of strap forwardly into a loop about an enclosed article, to clamp the free end of the loop of strap while withdrawing the strap and thereby draw the loop inwardly into tensioned contact with the article, to clamp the other end of the tensioned loop of strap, to shear the tensioned loop of strap from the remaining strap and finally to seal the tensioned loop of strap.

It is another object of the present invention to provide an improved strapping machine of the type described which is adapted for automatic or semiautomatic operation and which functions to apply and seal a tensioned band of strap for packaging and the like quickly, accurately, and without surveillance by a machine operator.

It is a further object of the present invention to provide an improved strapping machine useful in the application of a tensioned strap to articles supported and carried by a conventional conveyor.

It is a still further object of the present invention to provide an improved strapping machine having a compact and economical assembly with subassemblies which may be individually removed from and reinstalled in the machine for repair or replacement.

It is another object of the present invention to provide an improved strapping machine which is pneumatically operated and electrically controlled.

It is another object of the present invention to provide a strapping machine with an improved strap feed and tensioning subassembly adapted for rapidly feeding the strap into a loop about an enclosed article, for rapidly withdrawing the strap for drawing the loop into contact with the article and for withdrawing the strap at a reduced rate for accurately tensioning the strap, and with smooth transitioning from the rapid strap feed to the rapid strap withdrawal and from the rapid strap withdrawal to the strap withdrawal at a reduced speed.

It is another object of the present invention to provide a strapping machine with an improved control system for accurately terminating the forward feeding of strap and for ensuring appropriate tensioning of the strap.

It is another object of the present invention to provide a strapping machine with an improved strap sealing mechanism having sealing jaws retractable from their operative sealing position to facilitate the feed and withdrawal of the strap.

It is another object of the present invention to provide a strapping machine with an improved strap clamping mechanism adapted for selectively receiving and releasing the strap and for selectively clamping and unclamping the strap.

It is a further object of the present invention to provide a strapping machine with a unit, comprising a pair of strap clamping subassemblies and an intermediate strap sealer subassembly, which is compact and which is constructed to provide accurate and reliable operation over a long service life.

Other objects will be in part obvious and in part pointed out more in detail hereinafter.

The invention accordingly consists in the features of construction, combination of elements and arrangements of parts which will be exemplified in the construction hereinafter set forth, and the scope of the application of which will be indicated in the appended claims.

In the drawings:

FIG. 1 is a side elevation view, partly broken away, of an installation of an embodiment of a strapping machine of the present invention, showing an article in broken lines in position for having a loop of tensioned strap applied therearound;

FIG. 2 is an enlarged section view, partly broken away, of a strap feed and tension subassembly of the strapping machine;

FIG. 3 is a reduced longitudinal section view of the strap feed and tension subassembly of FIG. 2;

FIG. 4 is a partial section view, partly broken away, taken substantially along line 4—4 of FIG. 3;

FIG. 5 is an enlarged transverse section view, partly broken away and partly in section, of the strapping machine showing a first clamping subassembly thereof with one of its clamps in a withdrawn released position and another of its clamps in an extended clamping position;

FIG. 6 is an enlarged transverse section view, partly broken away and partly in section, of the strapping machine showing a second clamping subassembly thereof;

FIG. 7 is an enlarged longitudinal end view, partly broken away, of the strapping machine showing a seal magazine and transfer subassembly thereof;

FIG. 8 is a partial longitudinal side view, partly broken away and partly in section, of the strapping machine showing the seal magazine and transfer subassembly of FIG. 7;

FIG. 9 is an enlarged transverse section view, partly broken away and partly in section, of the strapping machine showing a sealer subassembly thereof with one of its jaws in an extended sealing position and its other jaw in a position intermediate its sealing and fully retracted positions;

FIG. 10 is an enlarged longitudinal section view, partly broken away and shown partly by broken lines, of the strapping machine showing the sealer subassembly with the sealer jaws in their intermediate position of FIG. 9;

FIG. 11 is an enlarged transverse section view, partly broken away and partly in section, of the strapping machine showing the sealer subassembly with the sealer jaws fully retracted;

FIG. 12 is an enlarged longitudinal side view, partly broken away and partly in section and shown partly by broken lines, of the strapping machine;

FIG. 14 is a schematic representation of the control system of the strapping machine;

FIG. 15 is a table showing the sequence of operations of the strapping machine;

FIG. 16 is an enlarged plan view of a seal stripping slide and finger of the strapping machine and FIG. 17 is an enlarged transverse section view, partly broken away and partly in section, showing a latch of the sealer subassembly.

Figure 13:
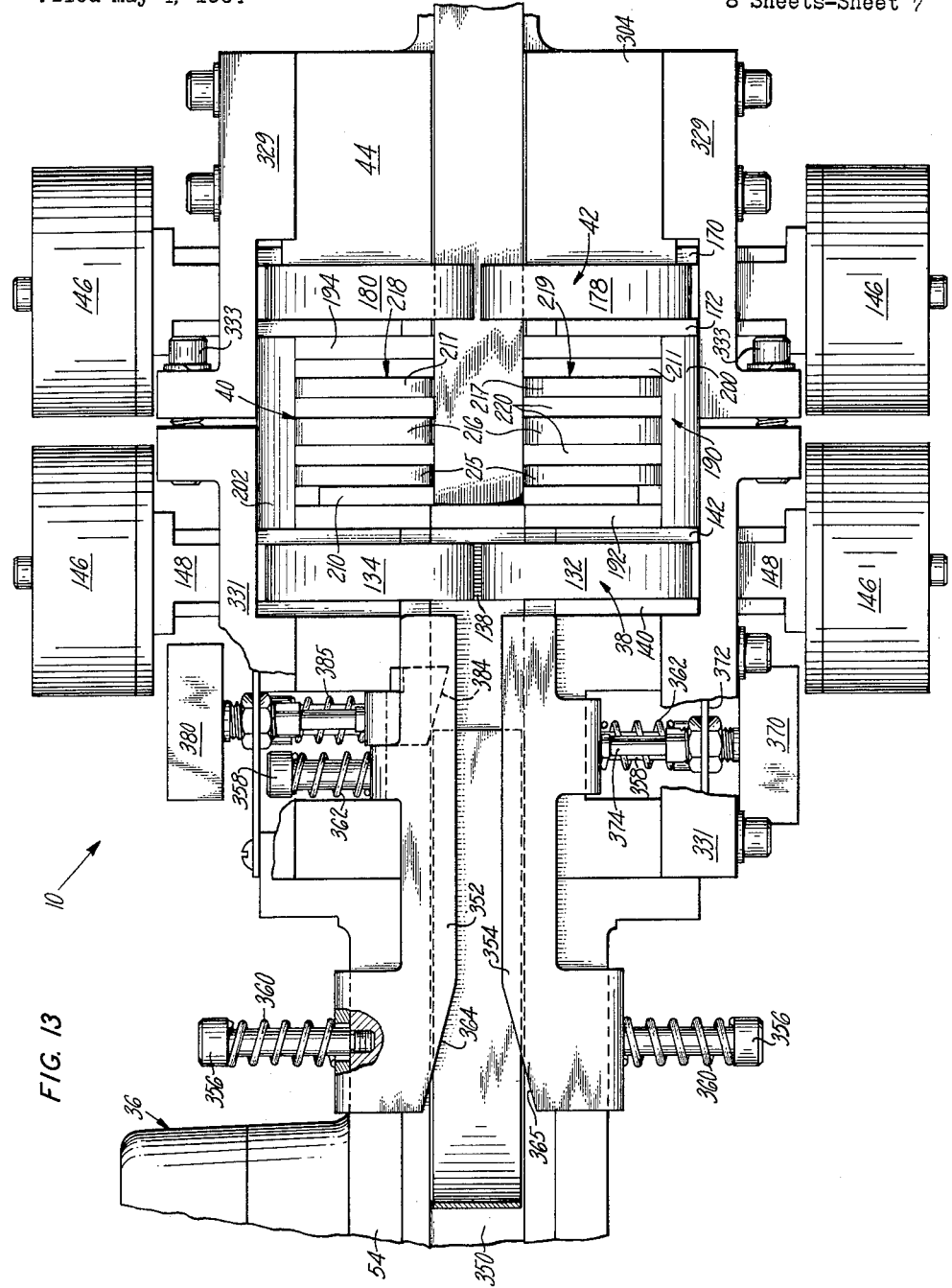
FIG. 13 is an enlarged longitudinal front view partly broken away of the strapping machine.

Referring now to the drawings in detail, an embodiment of the strapping machine of the present invention, generally denoted by the numeral 10, is shown installed for applying a strap to an article 12 supported on rollers 14 of a conventional conveyor.

The frame of the installation comprises a pair of upright posts 16, 18 and suitable horizontal structural members secured between the upright posts and onto which a generally rectangular strap chute 24 is mounted. In a conventional manner, an entrance end 30 of the chute 24 is adapted to receive a free end of the strap as the strap is fed by the strapping machine 10 from a coil of strap (not shown) with the chute 24 thereby providing a track or guideway for guiding the strap about the article 12 and for returning the free end of strap via an exit end 32 of the chute to the strapping machine.

In the shown installation the strapping machine 10 is secured to the post 18 in a generally upright position with its operative parts in stacked association, the operative parts for clarity being generally designated as a strap feed and tension subassembly 36, a free end clamping subassembly 38, a sealer subassembly 40, a reel end clamping subassembly 42, and a seal magazine and transfer subassembly 44.

Referring to FIGS. 2 and 3, the strap feed and tension subassembly 36 comprises a feed wheel 50 and a tension wheel 52 which are aligned for engagement with the strap for feeding or withdrawing the strap, respectively. As seen in FIG. 3, there is mounted in a multipart housing or frame 54 of the strap feed and tension subassembly an inclined strap guideway 56 having slotted openings 58, 60 for receiving the wheels 50, 52 and a guideway portion 62 intermediate these openings. The wheels 50, 52 are preferably serrated to provide teeth facing in their direction of rotation to assist in gripping the strap.

The wheels 50, 52 are shown integrally formed with parallel drive shafts 63, 65 which are rotatably mounted in the housing 54, as by conventional ball bearing assemblies mounted on the ends of the shafts. A pair of rotary air motors 64, 66 mounted on the housing 54 are operably connected to the shafts 63, 65 for driving the wheels 50, 52. These rotary air motors 64, 66 are identical in the shown embodiment excepting for the incorporation of a speed reducer 67 in the air motor 66 for providing a relatively high torque, low speed drive in comparison with a relatively low torque, high speed drive provided by the air motor 64. The motors 64, 66 are connected for individually or collectively driving the feed and tension wheels 50, 52 through a bevel gear 68 secured to the drive shaft 70 of the low torque air motor 64. The drive shaft 72 of the high torque air motor 66 is connected to the bevel gear 68 by means of a pair of intermeshing spur gears 74, 76 and an overrunning or one-way clutch 78 driven by the spur gear 76 and which, upon engagement, operatively connects the spur gear 76 to the bevel gear 68. The bevel gear 68 is connected to the shafts 63, 65 by a gear train which includes a bevel gear 80 affixed to a shaft 82 suitably mounted for rotation in the housing 54 and to which is affixed a spur gear 84. The spur gear 84 intermeshes with a relatively large spur gear 86 to rotate the tension wheel 52 at a relatively low speed, and a relatively small spur gear 88 intermeshes with the spur gear 86 to rotate the feed wheel 50 at a relatively high speed and in an angular direction opposite the tension wheel 52.

The output shafts 70, 72 of the air motors 64, 66, respectively, are driven in opposite angular directions. Accordingly, either or both of the rotary air motors 64, 66 are adapted to drive the feed and tension wheels with the tension wheel 52 being driven at a lower speed and therefore with a greater torque than the feed wheel 50. With only the low torque, high speed air motor 64 operating, the feed and tension wheels are normally driven at a relatively high speed with the overrunning clutch 78 being disengaged to disconnect the high torque, low speed air motor 66. With the air motor 66 also operating, the overrunning clutch 78 remains disengaged until the rotational speed of the drive shaft 70 is reduced to equal the rotational speed of the spur gear 76 by the drag of the tensioned strap, at which point the torque of the high torque air motor 66 is combined with that of the low torque air motor 64 to effect a substantial increase in the strap tension.

Control of the feeding and withdrawing of the strap is provided by a pair of idler or backup wheels 90, 92 adapted for selective cooperation with the feed and tension wheels 50, 52, respectively. Referring to FIG. 4, the backup wheels are rotatably mounted on a pair of side plates 94, 95 of a rocker arm 96 pivotally mounted on the frame 54 by a shaft 104. More particularly, the backup wheels 90, 92 are mounted on journals 98 fixed between the side plates 94, 95 by machine fasteners 100. By pivoting the rocker arm 96 the backup wheels 90, 92 can be selectively pivoted into engagement with the strap for pressing the strap against the feed or tension wheel and thereby selectively feed the strap forwardly through the strapping machine or withdraw the strap for tensioning it about an article. For pivoting the rocker arm there is mounted on the frame 54 a reversing air cylinder 106 having a double-acting piston 108. A piston rod 112 secured to the piston 108 has an enlarged integral head 114 pivotally connected between the rocker arm side plates 94, 95 by a pivot pin 116. Compressed air is selectively supplied to opposite ends of the cylinder to selectively move the backup wheels 90, 92 into engagement with the strap to force the strap into engagement with the serrated periphery of the feed and tension wheels, respectively. Because of the greater driving torque on the tension wheel during the final tensioning of the strap about the article, the pneumatic pressure on the piston 108 is preferably increased during this period with the inward movement of the piston rod 112 being limited by an adjustable stop 120 to prevent excessive engagement of the teeth of the tension wheel with the strap and with the increase in pressure being conveniently initiated with the high torque air motor 66. With appropriate control of the strap feed and tension subassembly 36 the strap may be fed forwardly from the strap guideway 56, through the sealer subassembly 40 and the clamping subassemblies 38, 42 and around the chute until the free end of strap overlaps with the strap in the sealer, and then withdrawn to draw the loop of strap inwardly from the chute and into contact with the article for tensioning it about the article before sealing.

In order to hold the free end of strap during the withdrawal and tensioning of the strap, the clamping subassembly 38 is first actuated to clamp the free end of strap. Referring to FIG. 5, the clamping subassembly 38 has a pair of plate clamps 132, 134 which are adapted to hold the free end of strap against a stationary anvil 138 forming a part of the frame 54, as seen in FIG. 3, and for this purpose the clamps 132, 134 are provided with opposed laterally extending projections or lips 135 which may be positioned in overlying relationship with the anvil 138 to clamp the strap therebetween. The clamps 132, 134 are mounted between a pair of spaced parallel side plates 140, 142 with which they have sliding engagement and which form a structural frame for the subassembly. The clamps are actuated by air cylinders 144, 146 between withdrawn released positions, shown by the clamp 134, and extended clamping positions, shown by the clamp 132. The mounts 148, 150 for the air cylinders are fixed between the parallel side plates 140, 142 and are secured thereto by a plurality of fasteners 152. The clamps 132, 134 are adapted for lateral withdrawal and extension by the positioning air cylinders 146 for which purpose the actuating rods 154 of the air cylinders 146 are pivotally connected to the clamps. For limiting the lateral withdrawal of the clamps, bushing stops 158 are mounted intermediate the plates 140, 142 by suitable screw fasteners 159. The operation of the clamps 132, 134 by the air motors 146 enables the clamps to be laterally withdrawn for removal of a sealed loop of tensioned strap and to be extended into position for defining with the anvil 138 a guide slot for receiving the free end of strap.

The clamping force on the strap is provided by clamping air cylinders 144 through levers 160 having integral journals 162 rotatably mounted in the side plates 140, 142. Each lever has an integral pin 164 positioned eccentrically of the lever journal 162 and pivotally supporting one of the clamps 132, 134. Rods 166 of the air cylinders 144 are pivotally connected to the levers by pivot pins 168 and, accordingly, upon pneumatic operation of the air cylinders 144 the clamps 132, 134 can be withdrawn to clamp the free end of strap against the anvil 138. With this arrangement the clamping movement of the clamps 132 is minimal and the clamping force applied against the strap is substantial.

The side plates 140, 142 are contoured to receive the anvil 138 in appropriate alignment with the clamps and are recessed above the anvil 138 to provide slot openings 169 in alignment with the strop guide 56 whereby the strap is adapted to pass freely through these openings as it is fed and withdrawn by the feed and tension subassembly 36.

Referring to FIG. 6, the clamping subassembly 42 in the shown embodiment is substantially identical to the clamping subassembly 38 with the exception that its side plates 170, 172 are configured for receiving an anvil portion 175 of the seal magazine and transfer subassembly 44 and to provide an opening 174 for allowing the transfer of a seal 176 through the clamping subassembly 42 to the sealer subassembly 40. As with the clamping subassembly 38 a pair of clamps 178, 180 are adapted for being laterally positioned by a pair of air cylinders 146 (FIG. 1) for defining with the anvil 175 a guide passage for the strap and for being positioned for removal of the sealed loop of strap. Additionally, the clamps 178, 180 can be actuated by a pair of clamping air cylinders 144 (FIG. 1) for clamping the reel end of the strap against the anvil 175 after the loop of strap has been tensioned about the article and prior to the application of a seal to the loop by the sealer subassembly 40.

Referring to FIGS. 1 and 9–11, the sealer subassembly 40 comprises a sealer unit, generally denoted by the numeral 190, having a frame with a pair of spaced parallel side plates 192, 194 and a sealer actuating mechanism, generally denoted by the numeral 196. The sealer unit 190 is interposed between the clamping subassemblies 38, 42 with the side plates 192, 194 in engagement with the side plates 142 and 172 of the clamping assemblies 38, 42, respectively. The side plate 194 is shown cast with a pair of inwardly projecting spacers 200, 202 to which the other side plate 192 is suitably affixed. Mounted between the side plates 192, 194 is a sealer support 204 which comprises a central sleeve portion 206 reciprocably mounted in the frame 54 (FIG. 12) and having a lower bifurcated end with spaced lugs 208 to which a pair of support plates 210, 211 are secured by pins 212. The plates 210, 211 are slideably mounted on the side plates 192, 194 between the spacers 200, 202 and pivotally support by pivot pins 214 the jaw plates 215, 216, 217 of a pair of sealing or crimping jaws 218, 219. Interposed between the jaw plates 215–217 are a pair of punch plates 220 which have elongated slots 222 for receiving the pins 214 and which are therefore reciprocable relative to the pivot axis of the jaws. The punch plates are connected to the jaw plates by additional transverse pins 224 which are secured in aligned openings in the jaw plates and loosely received within enlarged openings 226 in the punch plates 220. Accordingly, with the pivotal movement of the jaws from their laterally withdrawn positions (shown by jaw 219 in FIG. 9) the punch plates 220 are cammed by the pins 224 to provide cooperative action with the jaws for securing a seal to the overlapping portions of a loop of strap. For this purpose anvil plates, generally designated by the numeral 228, are positioned between the opposing jaw plates of the jaws and retained therebetween by partially cylindrical projections 230 of the jaw plates formed coaxially with the jaw pivot pins 214 and conforming concave edges 231 of the anvils.

The jaws 218, 219 are actuated by a ram or rod 234 reciprocably mounted in the sleeve 206 and having an inner end formed to provide three spaced parallel plate portions 236, 237, 238. Mounted between these plate portions 236–238 by pivot pins 240 are two pairs of links 242 which also extend between the jaw plates 215–217 for pivotal connection thereto by pivot pins 246. The pivot pins 240 extend laterally within elongated slots 244 in the support plates 210, 211 to thereby limit the freedom of movement of the rod 234 relative to the support 204, which freedom of movement allows for pivoting the jaws 218, 219 about their pivot pins 214.

The spacers 200, 202 and jaw plates 215–217 cooperate to control the sequencing of the reciprocable and pivotal movement of the jaws for sealing the loop of strip. For this purpose the jaw plates have elongated bearing surfaces 250 engageable with bearing surfaces 251 of the spacers 200, 202 for controlling the longitudinal movement of the jaws and have partially cylindrical bearing surfaces 252 coaxial with the jaw pivot pins 214 and engageable with conforming concave bearing surfaces 254 on the spacers 200, 202 for allowing pivotal movement of the jaw plates. Accordingly, by moving the rod 234 from its fully retracted position, the sealer support 204 is initially moved with the rod 234 until the jaw plates are free to pivot outwardly on the bearing surfaces 254, at which point further movement of the sealer support 204 may be limited by the provision of a stop nut 256 threaded for adjustment onto the outer end of the support sleeve 206 and engageable with the frame 54, as seen in FIG. 12. Thereafter, the inner movement of the rod functions to pivot the sealer jaws from their laterally withdrawn positions to their sealing positions, at which point the links 242 extend substantially perpendicular to the axis of longitudinal movement of the actuating rod, as seen in FIG. 9.

Referring to FIG. 12, the sealer actuating mechanism 196 includes an air cylinder 260 having a double-acting piston 262. The piston rod 264 is operatively connected to the actuating rod 234 by an intermediate bell crank 266 pivotally mounted on the frame 54 and a pair of links 268, 270. For applying a seal to the tensioned loop of strap the piston 262 is actuated to the left, as seen in FIG. 12, to extend the actuator rod 234. With the sealer jaws fully retracted, the steel strapping is fed forwardly from the strap feed and tension subassembly 36 through the free end clamping subassembly 38, through a slot 272 in the sealer side plate 192, between the retracted sealing jaws and anvils 228, through an elongated slot 274 in the sealer side plate 194 and adjacent the face of the anvil 175 of the reel end clamping subassembly 42. The sealer support plate 210 is provided with an inclined shearing edge 275 which cooperates with an opposing shearing edge 277 in the side plate 192 to shear the strap as the sealer support 204 is extended, which shearing is completed prior to the pivotal operation of the sealing jaws.

Referring now to FIGS. 1, 7 and 8, the seal magazine and transfer subassembly 44 comprises an elongated magazine 300 adapted for receiving a plurality of seals 176 that are stacked in the magazine in generally U-shaped form. A subassembly frame 304 to which the magazine is secured supports an elongated way 306 against which the stack of seals is urged into contact as by a suitable spring 308. The way 306 is provided with a T-shaped slot adjacent the seal stack for reciprocably mounting a seal stripping slide 310. The slide 310 has an outer bifurcated end 312 for receiving the pivot 314 of a bell crank 316 actuated by an air cylinder 318 whereby the air cylinder 318 is adapted to move the slide rearwardly through the clamping subassembly 42 into the sealer subassembly 40. By this action the slide strips a seal 176 from the seal stack and conveys it into position between the retracted sealing jaws. For retaining a seal on the slide while it is conveyed to the sealing jaws, a finger 317 is mounted on the slide 310 with an extension 319 spaced from the slide for receiving a seal therebetween. For removing the seal from the slide when the slide 310 is withdrawn from the sealer, a latch 320 (FIG. 10) is fixed to the anvil 228 retained between the sealer jaws 217. The latch is provided with a spring-biased catch 322 (FIG. 10) which is suitably contoured to function as a one-way latch for the seal for which purpose the projection 319 (FIG. 8) of the finger 317 is slotted for receiving the catch.

The four subassemblies 38, 40, 42 and 44 are stacked together and secured to the frame 54. As seen in FIG. 12, the subassemblies 38, 40, 42 are stacked with the edges of their side plates in engagement with a projection 325 of the frame 54 and the subassembly 44 is affixed to the projection 325 as by a screw 327. Referring to FIG. 13, the four subassemblies are additionally collectively secured to the frame 54 by two pairs of cooperating clamping members 329, 331 secured, respectively, to the frame 304 of the subassembly 44 and to the frame 54. The clamping members 329, 331 are secured together by machine screws 333 which are readily loosened for removal and reinstallation of one or more of the subassemblies 38, 40, 42, 44.

Referring to FIG. 13, the front face of the frame 54 is provided with a trough 350 which functions as a guideway for returning the free end of the strap into position overlying the anvil 138 and the portion of the loop of strap between the jaws of the sealer. The chute 24 provides for directing the free end of strap to the trough 350 where the strap is fed forwardly under a pair of strap gates 352, 354 partially overlying the trough 350. The gates 352, 354 are mounted on the frame 54 with laterally extending fasteners 356, 358 threaded to the frame 54 and compression springs 360, 362 which operate to bias the gates 352, 354 to their overlying position shown in FIG. 13. An electric switch 370 mounted on a plate 372 secured to the frame 54 is operatively connected to the gate 354 by a switch operating pin 374. After the free end of strap is clamped against the anvil 138 and upon the tensioning of the strap, the loop of strap is drawn inwardly from the trough 350, which, because of the tapered gate edges 364, 365, cams the gates 352, 354 outwardly against the force of the compression springs 360, 362 to actuate the electric switch 370, the gate 354 thereby functioning to sense the inward movement of the loop of strap from the strap guideway.

An electric switch 380 is mounted on the frame 54 for operation by a strap sensing tang 384 in a manner similar to the electric switch 370, the tang 384 being laterally displaceable against the bias of a compression spring 385. Tang 384 is rearwardly tapered for engagement by the leading edge of the strap which thereby displaces the tang laterally out of its path of movement to actuate the switch 380. The switch 380 thereby functions to sense the return of the free end of strap to the strapping machine and is connected in the control system of the strapping machine for terminating the forward feed of strap with the free end of strap extending over the anvil 138 and into overlying relationship with the portion of strap in the sealer.

The free end clamping subassembly 38 is then operated to clamp the free end of strap against the anvil 138, and the rotary air motor 64 is then operated to withdraw the strap at a relatively high speed, which withdrawal results in lateral displacement of the gate 354 to actuate the switch 370. The switch 370 when actuated provides for supplying high pressure to the reversing cylinder and to activate the high torque air motor 66 and thereby fully tension the strap about the article. In this regard, a timer 385 (FIG. 14) having a timer switch 393 is connected in the control system for ensuring an adequate interval of operation of the high torque air motor prior to clamping the strap against the anvil 175 by the reel end clamping subassembly 42.

Referring to the control system schematic shown in FIG. 14 in which schematic the standard NEMA and JIC electrical symbols are employed, the cycle for the machine, beginning with Step No. 8 in the sequence table of FIG. 15, is as follows:

(A) The positioning air cylinders 146 of the clamping subassemblies 38, 42 are operated to position the clamps into overlying position with their corresponding anvils to define slots for receiving the strap; the reversing air cylinder 106 is conditioned for strap feed; and the high speed air motor 64 is operated to feed the strap forwardly through the clamping subassemblies, the sealer subassembly and around the chute 24.

(B) The free end of strap engages the tang 384 to actuate the switch 380 and thereby conditon the reversing air cylinder 106 for low pressure strap withdrawal and step a program switch 391 from the No. 8 position to the No. 1 position. With the program switch 391 in the No. 1 position, operation of the high speed air motor 64 is terminated, and the air cylinders 144 of the free end clamping subassembly 38 are operated to clamp the strap against the anvil 138.

This is the normal or at-rest condition of the strapping machine. A cycle starting button 387 is provided for initiating the machine cycle from the rest condtion, with the control system providing for complete automatic sequencing of the machine through the steps numbered 1–8 of the sequence program of FIG. 14, when an automatic-manual switch 389 is in the automatic positon shown. With switch 389 in the manual or semiautomtaic position, the cycle switch 387 must be reactuated to step the program switch 391 from its No. 3 and No. 7 positions.

(C) Upon actuation of the start button 387, the program switch is indexed to its No. 2 position to operate the high speed air motor 64 to draw the loop of strap from the chute 24 and from the through 350.

(D) As the strap is withdrawn from the trough 350 the switch 370 is actuated to index the program switch to its No. 3 position to condition the reversing cylinder for high pressure strap withdrawal, and to activate the high torque air motor 66.

(E) The timer 385 is activated with the high torque motor 66 to effect a time delay before actuating timer switch 393 to index the program switch 391 to its No. 4 position where the clamping air cylinders 144 of the reel end clamping subassembly are operated to effect clamping of the reel end of the loop of strap and the seal feed cylinder 318 is cycled to transfer a seal from the magazine 300 to between the sealer jaws.

(F) A micro switch 395 is actuated by the seal stripping slide 310 as it is fully retracted to index the program switch 391 to its No. 5 position to deactivate the high speed and high torque air motors and to cycle the seeler air cylinder 260 and thereby shear the tensioned loop of strap from the remaining strap in the feed and tension subassembly and crimp and the seal onto the loop of strap.

(G) As the sealer is fully retracted, a micro switch 397 is actuated to index the program switch 391 to its No. 6 position where the clamping cylinders 144 of both clamping subassemblies are deactivated to release the strap; the positioning cylinders 146 of the clamping subassemblies are deactivated to laterally withdraw the clamps from overlying position with the anvils 138, 175; the reversing cylinder is deactivated; and the sealer is deactivated.

(H) A timer 400 is activated in conjunction with the sealer to provide a timed delay before actuating a timer switch 401 which functions to index the program switch to its No. 7 position.

(I) With the program switch in its No. 7 position the circuit through a seal sensing switch 403 (FIGS. 7 and 14) senses the availability of a seal in the seal magazine before commencing another machine cycle. If a seal is available in the magazine, the switch 403 functions to index the program switch to its No. 8 position for initiating a new cycle.

Thus it can be seen that the strapping machine of the present invention is adapted to provide in sequence, either automatically or semiautomatically, for forwardly feeding a strap from a coil thereof into a loop for receiving an article to be strapped; for withdrawing the strap to draw the loop into tensioned contact with the article; for sealing the loop of strap and for releasing the loop of sealed strap from the machine. Additionally the strapping machine comprises new and improved components for feeding and tensioning the strap, for clamping the strap and for sealing the strap which cooperate to give a smoothly functioning and highly reliable device. Further, the strapping machine of the present invention has a compact and economical assembly of parts capable of providing highly reliable service over a long life of continuous use, and is divided into subassemblies which may be readily detached and reinstalled for repair or replacement.

As will be apparent to persons skilled in the art, various modifications and adaptations of the structure above described will become readily apparent without departure from the spirit and scope of the invention, the scope of which is defined in the appended claims.

We claim:

1. A strapping machine for longitudinally feeding a free end of strap forwardly into a loop with overlapping portions of strap about an enclosed article, for withdrawing the strap for tensioning the loop about the article and for sealing and shearing the loop from the remaining strap, comprising in operative and sequential longitudinal alignment a strap feed and tensioning mechanism, a first clamping device for clamping the free end of the loop of strap, a strap sealer having a crimping jaw mechanism reciprocable between a retracted position and an extended operative position, a second clamping device for clamping the opposite end of the loop of strap, and a seal magazine and feed mechanism adapted for feeding a seal from the magazine to the strap sealer with the crimping jaw mechanism in its retracted position, said strap sealer being adapted for crimping the seal onto the overlapping portions of strap as the crimping jaw mechanism is reciprocated to its extended operative position, said crimping jaw mechanism being positioned longitudinally intermediate said first and second clamping devices, and said first and second clamping devices being operative independently of the strap sealer to clamp said free and said opposite ends of the loop of strap prior to the crimping of the overlapping portions of strap intermediate the first and second clamping devices whereby said intermediate overlapping portions of strap are sealed without being under longitudinal tension.

2. The strapping machine of claim 1 wherein the strap sealer includes means for shearing the loop from the remaining strap upon the movement of the crimping jaw mechanism from its retracted position to its operative position and before the crimping jaw mechanism has crimped the seal upon said intermediate overlapping portions of strap.

3. A strapping machine for longitudinally feeding a free end of strap forwardly into a loop with overlapping portions of strap about an enclosed article, for withdrawing the strap for tensioning the loop about the article and for sealing and shearing the loop from the remaining strap, comprising in operative and sequential longitudinal alignment a strap feed and tensioning mechanism, a first clamping device for clamping the free end of the loop of strap, a strap sealer having a crimping jaw mechanism reciprocable between a retracted position and an extended operative position, a second clamping device for clamping the opposite end of the loop of strap, and a seal magazine and feed mechanism adapted for feeding a seal from the magazine to the strap sealer with the crimping jaw mechanism in its retracted position, said strap sealer being interposed between the clamping devices and each of said clamping devices and said strap sealer having longitudinally spaced parallel side plates with the side plates of the strap sealer in engagement with the adjacent side plates of the clamping devices, said strap sealer being adapted for crimping the seal onto the overlapping portions of strap as the crimping jaw mechanism is reciprocated to its extended operative position, and said first and second clamping devices being operative independently of the strap sealer to clamp said free and said opposite ends of the loop of strap prior to the crimping of the overlapping portions of strap intermediate the first and second clamping devices whereby said intermediate overlapping portions of strap are sealed without being under longitudinal tension.

4. A strapping machine for longitudinally feeding a free end of strap forwardly into a loop with overlapping portions of strap about an enclosed article, for withdrawing the strap for tensioning the loop about the article and for sealing and shearing the loop from the remaining strap, comprising in operative and sequential longitudinal alignment a strap feed and tensioning mechanism, a first clamping device for clamping the free end of the loop of strap, a strap sealer having a crimping jaw mechanism reciprocable between a retracted position and an extended operative position, a second clamping device for clamping the opposite end of the loop of strap, and a seal magazine and feed mechanism adapted for feeding a seal from the magazine to the strap sealer with the jaw mechanism in its retracted position, said strap sealer having means for shearing the loop from the remaining strap as the crimping jaw mechanism moves from its retracted position to its operative position; said clamping devices including anvils for receiving the strap, clamps, and means for moving the clamps from laterally withdrawn positions to positions overlying the anvils for defining slots for receiving the strap therebetween and for actuating the clamps for clamping the strap against the anvils, said strap sealer being adapted for crimping the seal onto the overlapping portions of strap as the crimping jaw mechanism is reciprocated to its extended operative position, said crimping jaw mechanism being positioned longitudinally intermediate said first and second clamping devices, and said first and second clamping devices being operative independently of the strap sealer to clamp said free and said opposite ends of the loop of strap prior to the crimping of the overlapping portions of strap intermediate the first and second clamping devices whereby said intermediate overlapping portions of strap are sealed without being under longitudinal tension.

5. A strapping machine for longitudinally feeding a free end of strap forwardly into a loop with overlapping portions of strap about an enclosed article, for withdrawing the strap for tensioning the loop about the article and for sealing and shearing the loop from the remaining strap, comprising in operative and sequential longitudinal alignment a strap feed and tensioning mechanism, a first clamping device for clamping the free end of the loop of strap, a strap sealer having a crimping jaw mechanism reciprocable between a retracted position and an extended operative position, a second clamping device for clamping the opposite end of the loop of strap, and a seal magazine and feed mechanism adapted for feeding a seal from the magazine to the strap sealer with the jaw mechanism in its retracted position, said strap sealer having a frame with a pair of longitudinally spaced parallel side plates, said reciprocable jaw mechanism having a pair of longitudinally spaced parallel support plates reciprocable between said side plates and in slideable engagement therewith, one of the support plates and one of the side plates having cooperating shear edges for shearing the loop from the remaining strap as the jaw mechanism moves from its retracted position to its extended operative position, said strap sealer being adapted for crimping the seal onto the overlapping portions of strap as the crimping jaw mechanism is reciprocated to its extended operative position, said crimping jaw mechanism being positioned longitudinally intermediate said first and second clamping devices, and said first and second clamping devices being operative independently of the strap sealer to clamp said free and said opposite ends of the loop of strap prior to the crimping of the overlapping portions of strap intermediate the first and second clamping devices whereby said intermediate overlapping portions of strap are sealed without being under longitudinal tension.

6. A strapping machine for longitudinally feeding a free end of strap forwardly into a loop about an enclosed article, for withdrawing the strap for tensioning the loop about the article, and for sealing and shearing the loop from the remaining strap, comprising in longitudinal alignment a strap feed and tensioning mechanism, a first clamping device for clamping the free end of the loop of strap, a strap sealer having a crimping jaw mechanism reciprocable between a retracted inoperative position and an extended operative position, a second clamping device for clamping the opposite end of the loop of strap, and a seal magazine and feed mechanism adapted for feeding a seal from the magazine to the strap sealer with the crimping jaw mechanism in its retracted position, said strap sealer having means for shearing the loop from the remaining strap as the jaw mechanism moves from its retracted position to its operative position; each of said first and second clamping devices including an anvil, a pair of clamps, first operator means for shifting the clamps between laterally withdrawn positions and positions in spaced overlying relationship with the anvil for defining a slot for receiving the strap therebetween, and second operator means for moving the clamps to an operative position cooperative with the anvil for clamping the strap therebetween.

7. In a strapping machine, a device for longitudinally feeding a strap forwardly into a loop about an enclosed article and for withdrawing the strap for tensioning the loop about the article comprising, rotatable feed and tension wheels longitudinally aligned for engagement with a strap for feeding and withdrawing the strap respectively, relatively low speed high torque drive means, relatively high speed low torque drive means, transmission means operatively connecting the high and low torque drive means with the feed and tension wheels for driving the feed and tension wheels in opposite rotational directions, said transmission means operatively connecting the high speed low torque drive means with the tension wheel during relatively high speed drive thereof for withdrawing the strap about the article and for automatically connecting the low speed high torque drive means with the tension wheel upon a decrease in the speed of the tension wheel due to an increase in the tension in the strap, a pair of rotatable backup wheels adapted for cooperation with the feed and tension wheels respectively, and means for alternatively activating the feed and tension wheels for selectively feeding and withdrawing the strap respectively.

8. In a strapping machine, a device for longitudinally feeding a strap forwardly into a loop about an enclosed article and for withdrawing the strap for tensioning the loop about the article comprising, wheel means for feeding and withdrawing the strap, relatively low speed high torque drive means, relatively high speed low torque drive means, transmission means operatively connecting the high and low torque drive means with the wheel means, said transmission means operatively connecting the high speed low torque drive means with the tension wheel during relatively high speed drive thereof for withdrawing the strap about the article and for automatically connecting the low speed high torque drive means with the tension wheel upon a decrease in the speed of the tension wheel due to an increase in the tension in the strap, said transmission means including a one-way drive permitting the relatively high speed low torque drive means to independently drive the wheel means, and means for activating the wheel means for alternatively feeding and withdrawing the strap.

9. In a strapping machine, a device for longitudinally feeding a strap forwardly into a loop about an enclosed article and for withdrawing the strap for tensioning the loop about the article comprising, rotatable feed and tension wheels longitudinally aligned for engagement with a strap for feeding and withdrawing the strap respectively, relatively low speed high torque drive means, relatively high speed low torque drive means, transmission means operatively connecting the high and low torque drive means with the feed and tension wheels for driving them in opposite rotational directions at relatively high and low rotational speeds respectively, a rocker arm mounted for pivotal movement about a transverse axis, a pair of backup wheels rotatably mounted on the rocker arm for selective cooperation with the feed and tension wheels respectively by pivotal movement of the rocker arm, and means for pivoting the rocker arm, said transmission means operatively connecting the high speed low torque drive means with the tension wheel during relatively high speed drive thereof for withdrawing the strap about the article and for automatically connecting the low speed high torque drive means with the tension wheel upon a decrease in the speed of the tension wheel due to an increase in the tension in the strap.

10. In a strapping machine, a device for longitudinally feeding a strap forwardly into a loop about an enclosed article and for withdrawing the strap for tensioning the loop about the article comprising, rotatable feed and tension wheels longitudinally aligned for engagement with a strap for feeding and withdrawing the strap respectively, a relatively low speed high torque drive, a relatively high speed low torque drive, transmission means operatively connecting the high and low torque drives with the feed and tension wheels for simultaneously driving them in opposite rotational directions at relatively high and low rotational speeds respectively, said transmission means including a one-way drive permitting the relatively low torque drive to independently drive the feed and tension wheels, a rocker arm mounted for pivotal movement about a transverse axis, a pair of backup wheels rotatably mounted on the rocker arm for selective cooperation with the feed and tension wheels respectively by pivotal movement of the rocker arm, and means for pivoting the rocker arm, said transmission means operatively connecting the high speed low torque drive means with the tension wheel during relatively high speed drive thereof for withdrawing the strap about the article and for automatically connecting the low speed high torque drive means with the tension wheel upon a decrease in the speed of the tension wheel due to an increase in the tension in the strap.

11. In a strapping device, a sealer assembly comprising a frame, a floating jaw support longitudinally reciprocable on the frame having an elongated support sleeve, a pair of cooperating sealing jaws pivotally mounted on the jaw support on opposite sides of the longitudinal axis of the sleeve and for pivotal movement about axes substantially fixed relative to the jaw support, a sealer actuating rod reciprocable within the support sleeve, linkage means operatively connecting the actuating rod and sealing jaws for pivoting the jaws upon longitudinal movement of the rod relative to the support sleeve, and control means mounted on the frame for effecting simultaneous longitudinal movement of the rod and jaw support for longitudinal displacement of the sealing jaws and independent longitudinal movement of the rod for pivoting the sealing jaws for sealing.

12. In a strapping device, a sealer assembly comprising a frame, a floating jaw support longitudinally reciprocable on the frame having an elongated support sleeve, a pair of cooperating sealing jaws pivotally mounted on the jaw support on opposite sides of the longitudinal axis of the sleeve and for pivotal movement about axes substantially fixed relative to the jaw support, a jaw actuating rod reciprocable within the support sleeve, linkage means operatively connecting the actuating rod and sealing jaws for pivoting the jaws upon longitudinal movement of the rod relative to the support sleeve, and guide bearing means mounted on the frame engageable by the sealing jaws for effecting simultaneous longitudinal movement of the rod and jaw support for longitudinal displacement of the sealing jaws and independent longitudinal movement of the rod for pivoting the sealing jaws for sealing.

13. In a strapping device, a sealer assembly comprising a frame, a floating jaw support longitudinally reciprocable on the frame, a pair of cooperating sealing jaws pivotally mounted on the jaw support, a longitudinally reciprocable jaw actuating rod, linkage means operatively connecting the actuating rod and sealing jaws for pivoting the jaws upon longitudinal movement of the rod relative to the jaw support, and guide bearing means on the frame engageable by the sealing jaws for effecting simultaneous longitudinal movement of the rod and jaw support for longitudinal displacement of the sealing jaws to an operating position and independent longitudinal movement of the rod for pivoting the sealing jaws for sealing, said guide bearing means comprising a pair of spaced guide bearings mounted on the frame engageable by the pair of sealing jaws respectively and having longitudinally extending guide bearing surfaces engageable by the sealing jaws for effecting said simultaneous longitudinal movement of the rod and jaw support and partially cylindrical guide bearing surfaces coaxial with the sealing jaws in their operating position for effecting said independent longitudinal movement of the rod.

14. In a strapping device, a sealer assembly comprising a frame having a pair of spaced parallel side plates, a floating jaw support having a pair of spaced parallel support plates reciprocable on said side plates for longitudinal movement therebetween, a pair of laterally spaced cooperating sealing jaws mounted between the support plates for pivotal movement thereon about axes substantially fixed relative to the jaw support and between withdrawn positions and sealing positions, a longitudinally reciprocable jaw actuating rod, linkage means operatively connecting the actuating rod and sealing jaws for pivoting the jaws upon longitudinal movement of the rod relative to the jaw support, and guide control means mounted on the side plates for effecting simultaneous longitudinal movement of the rod and jaw support for longitudinal displacement of the sealing jaws to an operating position and independent longitudinal movement of the rod for pivoting the sealing jaws in their operating position from their withdrawn to their sealing positions.

15. The sealer assembly of claim 14 wherein the guide control means comprises a pair of spaced guide bearings engageable by the pair of sealing jaws respectively and having longitudinally extending bearing surfaces engageable by the sealing jaws for effecting said simultaneous longitudinal movement of the rod and jaw support and partially cylindrical bearing surfaces coaxial with the sealing jaws in their operating position for effecting said independent longitudinal movement of the rod, and wherein the linkage means comprises links pivotally mounted to the actuating rod and to the sealing jaws and with the links extending substantially perpendicular to the longitudinal axis of the actuating rod with the sealing jaws in their sealing positions.

16. In a strapping device, a strap clamping mechanism comprising a frame, a lever pivotally mounted on the frame, an elongated clamp pivotally connected to the lever eccentrically of the pivotal axis thereof, said clamp having a lip adapted in an operative position of the clamp for receiving a strap, and operator means for pivoting the clamp into and out of said operative position and with the clamp in its operative position for actuating the lever for drawing the lip against the strap.

17. In a strapping device, a strap clamping mechanism comprising a frame, a pair of levers pivotally connected to the frame, a pair of laterally spaced clamps pivotally connected to the pair of levers respectively eccentrically of the pivotal axes thereof, said pair of clamps having inwardly extending lateral lips adapted in operative pivotal positions of the clamps for receiving a strap, and operator means for pivoting the clamps into and out of their operative positions for receiving and releasing a strap respectively and for actuating the levers for drawing the clamps in their operative positions against the strap.

18. In a strapping device, a strap clamping mechanism comprising a frame having a pair of spaced parallel side plates, a pair of laterally spaced clamps interposed between the side plates having inwardly extending lateral lips adapted in operative pivotal positions of the clamps for receiving a strap, a pair of levers pivotally mounted on the frame between the side plates, said pair of clamps being pivotally connected to the pair of levers respectively eccentrically of the pivotal axes thereof, first operator means for pivoting the clamps into and out of their operative positions for receiving and releasing a strap respectively, and second operator means for actuating the levers for drawing the clamps in their operative positions against the strap.

19. In a strapping device, a strap clamping mechanism comprising a frame having a pair of spaced parallel side plates, a pair of levers journaled to the side plates for pivotal movement therebetween, a pair of laterally spaced plate clamps interposed between the side plates for sliding engagement therewith, the pair of clamps being pivotally connected to the pair of levers respectively eccentrically of the pivotal axes thereof and having inwardly extending lateral lips adapted in operative pivotal positions of the clamps for receiving a strap, a first pair of motors for laterally pivoting the clamps respectively into and out of their operative positions for receiving and releasing the strap respectively, and a second pair of motors for actuating the levers respectively for drawing the clamps in their operative positions against the strap.

References Cited by the Examiner

UNITED STATES PATENTS

| 2,194,108 | 3/1940 | Wright | 100—26 |
| 2,195,043 | 3/1940 | Wright | 100—26 |
| 2,215,121 | 9/1940 | Harvey et al. | 100—4 |
| 2,707,429 | 5/1955 | Leslie et al. | 100—30 X |
| 2,707,430 | 5/1955 | Leslie et al. | 100—30 X |
| 2,764,082 | 9/1956 | Saquet | 100—30 |
| 2,882,814 | 4/1959 | Winkler et al. | 100—25 |
| 2,908,215 | 10/1959 | Fawcett | 100—26 |
| 3,012,497 | 12/1961 | Fryer | 100—26 |
| 3,101,663 | 8/1963 | Hall et al. | 100—30 |
| 3,104,606 | 9/1963 | Kerrigan | 100—30 X |
| 3,120,171 | 2/1964 | Hall et al. | 100—30 X |
| 3,139,813 | 7/1964 | Hall et al. | 100—30 X |
| 3,146,695 | 9/1964 | Van De Bilt | 100—31 X |

FOREIGN PATENTS

| 615,491 | 1/1949 | Great Britain. |
| 775,926 | 5/1957 | Great Britain. |
| 915,173 | 1/1963 | Great Britain. |

WALTER A. SCHEEL, *Primary Examiner.*